United States Patent
Yamamoto

(10) Patent No.: US 8,396,494 B2
(45) Date of Patent: Mar. 12, 2013

(54) MOBILE COMMUNICATION TERMINAL APPARATUS

(75) Inventor: Kazuhiro Yamamoto, Osaka (JP)

(73) Assignee: KYOCERA Corporation, Kyoto (JP)

( * ) Notice: Subject to any disclaimer, the term of this patent is extended or adjusted under 35 U.S.C. 154(b) by 520 days.

(21) Appl. No.: 12/399,454

(22) Filed: Mar. 6, 2009

(65) Prior Publication Data

US 2009/0233632 A1 Sep. 17, 2009

(30) Foreign Application Priority Data

Mar. 11, 2008 (JP) ................... 2008-060845

(51) Int. Cl.
H04W 4/00 (2009.01)
(52) U.S. Cl. .................. 455/466; 455/414.1; 455/412.1; 455/575.1; 715/752; 715/763; 715/863
(58) Field of Classification Search ........................ None
See application file for complete search history.

(56) References Cited

U.S. PATENT DOCUMENTS

| | | | | |
|---|---|---|---|---|
| 7,565,404 B2 * | 7/2009 | Gwozdz | ....................... | 709/206 |
| 7,669,135 B2 * | 2/2010 | Cunningham et al. | ........ | 715/758 |
| 2004/0018858 A1 * | 1/2004 | Nelson | ........................... | 455/566 |
| 2004/0225640 A1 * | 11/2004 | Brown et al. | ...................... | 707/3 |
| 2007/0101005 A1 * | 5/2007 | Shim et al. | ..................... | 709/227 |

FOREIGN PATENT DOCUMENTS

| | | |
|---|---|---|
| JP | 2002-344520 | 11/2002 |
| JP | 2003-167830 A | 6/2003 |
| JP | 2003-264594 A | 9/2003 |
| JP | 2005-057618 A | 3/2005 |
| JP | 2005-184281 A | 7/2005 |
| JP | 2007-200159 | 8/2007 |

OTHER PUBLICATIONS

Office Action dated Nov. 16, 2010 issued by the Korean Patent Office for the corresponding Korean Patent Application No. 2009-0020693.
Translation of Office Action issued in JP2008-060845 issued Jun. 15, 2010 by Japanese Patent Office, 3 pages.
Office Action issued by the Japan Patent Office for Japanese Patent Application No. 2008-060845 dated Aug. 24, 2010.
Notification of Reasons for Refusal dated Oct. 9, 2012, issued in counterpart Japanese Application No. 2010-236093.

* cited by examiner

Primary Examiner — Vladimir Magloire
(74) Attorney, Agent, or Firm — Procopio, Cory, Hargreaves & Savitch LLP

(57) ABSTRACT

A mobile communication terminal apparatus of the present invention has a mail transmitting function, and stores therein a first mail text that includes particular data, and at least one destination. Also, the mobile communication terminal apparatus stores therein, for each of parties including the destination, replacement information that shows whether a party corresponding thereto requires mail text replacement. If the replacement information corresponding to the destination shows that mail text replacement is not required, the mobile communication terminal apparatus transmits the first mail text to the destination. If the replacement information corresponding to the destination shows that mail text replacement is required, the mobile communication terminal apparatus composes a second mail text from the first mail text by editing at least the particular data, and transmits the second mail text to the destination.

7 Claims, 8 Drawing Sheets

| NAME | TELEPHONE NUMBER | E-MAIL ADDRESS | REPLACEMENT INFORMATION |
|---|---|---|---|
| ICHIKO INOUE | 09034567890 | ichiko@aaa.com | 0 |
| JIRO SAITO | 09012345678 | saito@aaa.com | 1 |
| SABURO NISHIMURA | 09023456789 | nishi@bbb.co.jp | 0 |
| ... | ... | ... | ... |

FIG. 8

| DECORATION CHARACTERS | LEVEL INFORMATION |
|---|---|
| (T^T) | 2 |
| m(_ _)m | 1 |
| ♥♥ | 3 |
| ✓ | 1 |
| ... | ... |

FIG. 9

| NAME | TELEPHONE NUMBER | E-MAIL ADDRESS | REPLACEMENT INFORMATION |
|---|---|---|---|
| ICHIKO INOUE | 09034567890 | ichiko@aaa.com | 3 |
| JIRO SAITO | 09012345678 | saito@aaa.com | 1 |
| SABURO NISHIMURA | 09023456789 | nishi@bbb.co.jp | 2 |
| ... | ... | ... | ... |

MOBILE COMMUNICATION TERMINAL APPARATUS

CROSS-REFERENCE TO RELATED APPLICATION

The present application claims priority under 35 U.S.C. §119 of Japanese Patent Application No. 2008-060845, filed Mar. 11, 2008, entitled "MOBILE COMMUNICATION TERMINAL APPARATUS", the content of which is hereby incorporated in its entirety.

FIELD OF THE INVENTION

The present invention relates to a mobile communication terminal apparatus such as a mobile telephone, and particularly to a technique to edit the body text of incoming/outgoing mails.

DESCRIPTION OF THE RELATED ART

Conventional mobile communication terminal apparatuses, such as mobile telephone apparatuses, are capable of sending and receiving mails whose body text includes not only common characters such as hiragana and kanji, but also decoration data such as emoticons, pictographs and images.

Users sometimes use decoration data in mails addressed to recipients that are in a relatively close relationship, such as friends and family members. This is because such mails make the recipients feel familiar with the sender. On the other hand, users do not use decoration data in mails addressed to recipients that are not in such a close relationship, such as their bosses and customers. This is because such mails might be considered as impolite.

As a conventional technique, a mobile terminal apparatus that supports creation of mails that include decoration data is commonly known.

This type of mobile terminal apparatus calculates a favorability level for each of incoming and outgoing mails according to emoticons and the likes included in the body text. The mobile terminal apparatus stores the favorability levels as histories. When the user has created a mail, the mobile terminal apparatus calculates the favorability level of the created mail. If the favorability level of the created mail is judged as not sufficient in view of the histories of the favorability levels of the person to be the recipient, the mobile terminal apparatus automatically adds emoticons and the likes to the mail.

As a result, the mobile terminal apparatus can prevent the user from reducing the strength of the friendship with the recipients who are in a relatively close relationship by sending them mails that do not include emoticons and the likes.

However, since this conventional mobile terminal apparatus automatically adds emoticons to mails, there is a problem that the mobile terminal apparatus might add emoticons irrespective of the user's intention.

SUMMARY OF THE INVENTION

In view of the problem mentioned above, the present invention aims to provide a mobile communication terminal apparatus that can be used for prevention of sending of mails that reduce the strength of the friendship with the recipients while observing the proper manners of mails addressed to recipients that are not in such a close relationship, and further can prevent sending of mails that include decoration data not intended by the user, such as emoticons.

To solve the problem mentioned above, one aspect of the present invention provides a mobile communication terminal apparatus that has a mail transmitting function, the mobile communication terminal apparatus comprising: a mail storage unit that stores therein a first mail text that includes particular data, and at least one destination; a replacement information storage unit that stores therein, for each of parties including the destination, replacement information that shows whether a party corresponding thereto requires mail text replacement; and a mail transmission control unit operable to transmit the first mail text to the destination if the replacement information corresponding to the destination shows that mail text replacement is not required, and if the replacement information corresponding to the destination shows that mail text replacement is required, transmit a second mail text, composed from the first mail text through edition of at least the particular data, to the destination.

Another aspect of the present invention is a mobile communication terminal apparatus that has a mail receiving function, the mobile communication terminal apparatus comprising: a received mail storage unit that stores therein a first mail text of a received mail that includes particular data, and an address of a sender; a replacement information storage unit that stores therein replacement information that shows whether the sender requires mail text replacement; and a storage control unit operable to keep the received mail storage unit storing therein the first mail text if the replacement information corresponding to the sender shows that mail text replacement is not required, and if the replacement information corresponding to the sender shows that mail text replacement is required, the storage control unit controls the received mail storage unit to compose a second mail text from the first mail text by editing the particular data, and store therein the second mail text instead of the first mail text.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 8 shows a data structure and example contents of a decoration character table 1100;

FIG. 9 shows a data structure and example contents of an address book 2100;

DESCRIPTION OF THE PREFERRED EMBODIMENT

Figure 1:
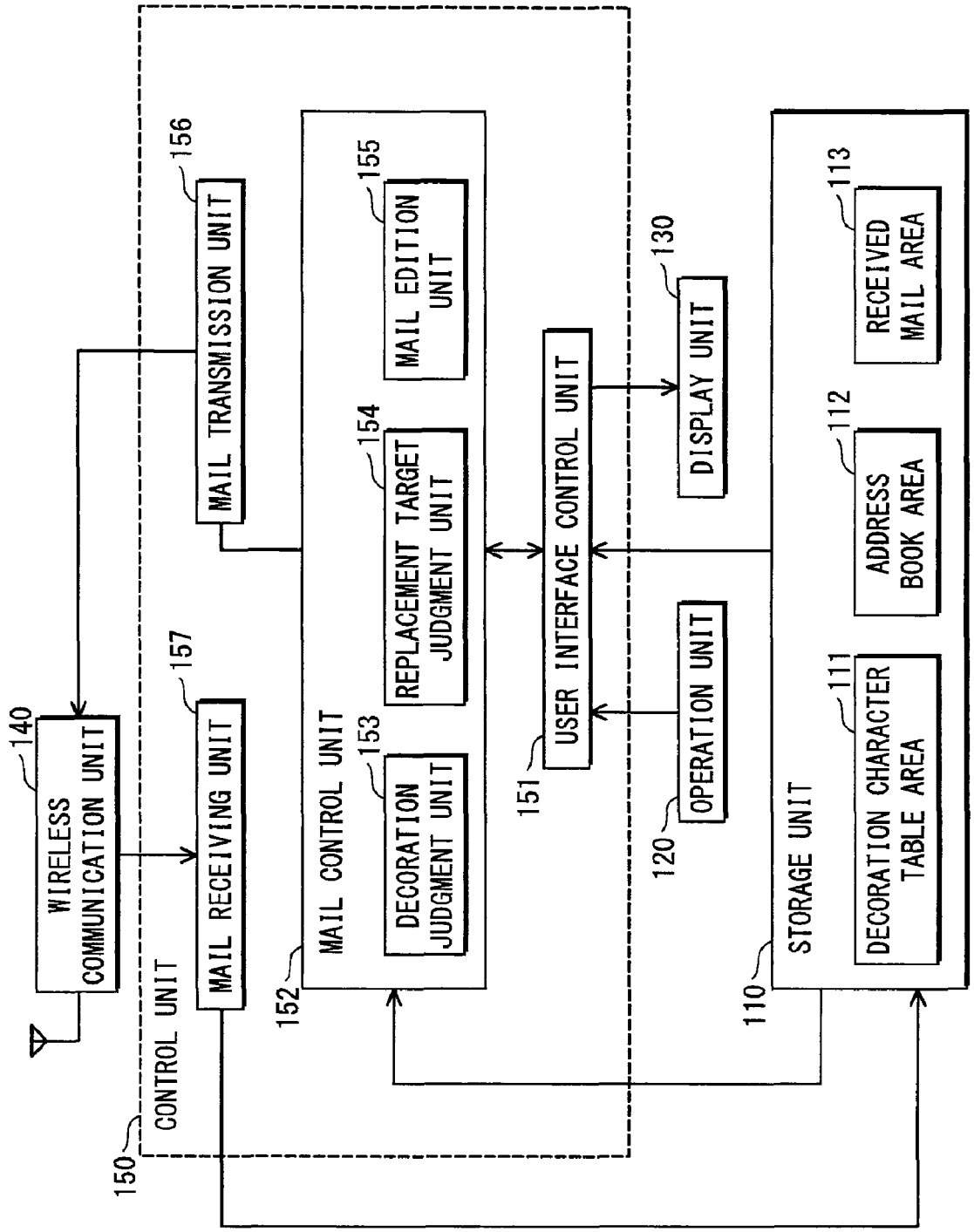
FIG. 1 is a functional block diagram of a mobile telephone apparatus 100 pertaining to the first embodiment of the present invention.

The following describes a mobile telephone apparatus as an embodiment of the mobile communication terminal apparatus pertaining to the present invention.

First Embodiment

Outline

The mobile telephone apparatus pertaining to the first embodiment is an improvement of a conventional mobile telephone apparatus that is capable of sending and receiving mails. In the case where the mail body input by the user or the mail body of the received mail to be displayed (hereinafter called "original text") includes decoration data, the mobile telephone apparatus is capable of generating a mail body that does not include the decoration data (hereinafter called "edited text") by removing the decoration data from the original text.

Here, the original text is an example of the first mail text pertaining to the present invention. The original text may be in a common text format, or in HTML (Hyper Text Markup Language) format.

The decoration data is an example of the particular data pertaining to the present invention. The decoration data is, for example, decoration characters such as emoticons and pictographs, an HTML description part in an HTML mail for decorating characters with designation of fonts, styles, etc., and images and so on used in the HTML descriptions.

The mobile telephone apparatus stores, for each party, replacement information showing whether to replace the original text which includes decoration data, with the edited data which does not include decoration data. In the case where the mail body input by the user (i.e. the original text) includes the decoration data, the mobile telephone apparatus judges, for each of one or more parties as the destinations of the mail, whether to perform the replacement based on the replacement information. That is, if the party is a person that requires the mail text replacement with the edited text (replacement target person), the mobile telephone apparatus sends a mail that includes the edited text, and if the party is a person that does not requires the mail text replacement with the edited text (non-target person), the mobile telephone apparatus sends a mail that includes the original text input by the user.

Accordingly, when sending a mail to any of a plurality of parties including the replacement-target person and the non-target person, the user of the mobile telephone apparatus is only required to prepare an original text that includes decoration data intended by the user. This simple operation enables the user to send, to the non-target person, a mail that is composed of the original text that includes the decoration data, while sending, to the replacement-target person, a mail that is composed of the edited text from which the decoration data has been removed. That is, the mobile telephone apparatus can save steps for preparing a mail body by removing the decoration data from the original text only for the replacement-target people.

Also, in the case where decoration data is included in the mail body (the original text) which has been selected by the user, if the party as the sender is a replacement target person, the mobile telephone apparatus stores, after displaying the mail, the edited text from which the decoration data has been removed, instead of the original text.

As a result of the removing of the decoration data from the mail, the mobile telephone apparatus can reduce the size of the received mail to store. Also, when the user reads the received mail again, the user can easily grasp the main point of the mail, because the decoration data such as pictographs has been removed and the mail has a simple appearance.

Structure

FIG. 1 is a functional block diagram of a mobile telephone apparatus 100 pertaining to the first embodiment of the present invention.

The mobile telephone apparatus 100 has basically the same hardware structure as conventional mobile telephone apparatuses, and includes a processor and a memory in addition to a speaker, a microphone, and so on.

Regarding the functions, the mobile telephone apparatus 100 includes, as FIG. 1 shows, a storage unit 110, an operation unit 120, a display unit 130, a wireless communication unit 140, and a control unit 150. Note that FIG. 1 shows the relation among functional components that are important for realizing the features of the present invention.

The storage unit 110 is a memory area that includes a decoration character table area 111, an address book area 112, and a received mail area 113. The decoration character table area 111 is a memory area for storing therein a decoration character table 1000 depicted in FIG. 2. The address book area 112 is a memory area for storing therein an address book 2000 depicted in FIG. 3. The received mail area 113 is a memory area for storing therein received mails.

The decoration character table 1000 is data in which emoticons and pictographs are registered. The address book 2000 is data which shows, for each party, the correspondence among a name, a telephone number, an e-mail address, and replacement information. The decoration character table 1000 is described in detail later.

The character string storage unit of the present invention is equivalent to the decoration character table area 111. The replacement information storage unit of the present invention is equivalent to the address book area 112. The received mail storage unit of the present invention corresponds to the received mail area 113.

The operation unit 120 includes keys, such as a numeric keypad, and buttons. The operation unit 120 is a circuit that informs the control unit 150 about the user's operation. The user uses the operation unit 120 to select any of the functions of the mobile telephone apparatus 100, to input a mail text, and so on.

The display unit 130 is a circuit that includes a liquid crystal display (LCD), and displays various types of images including characters, icons and so on on the LCD according to instructions from the control unit 150.

The wireless communication unit 140 is a circuit that is equipped with an antenna and performs transmission and reception of radio waves with the base station. The wireless communication unit 140 has a function to communicate with other communication apparatuses such as mobile telephone apparatuses via the base station.

The control unit 150 has a function to control the whole mobile telephone apparatus 100, and includes a user interface control unit 151, a mail control unit 152, a mail transmission unit 156 and a mail receiving unit 157. Each function of the control unit 150 is realized by software. In other words, each function is realized by the processor executing programs that are stored in the memory.

The transmission control unit of the present invention is equivalent to the pair of the mail control unit 152 and the mail transmission unit 156. The display control unit of the present invention is equivalent to the user interface control unit 151. The storage control unit of the present invention is equivalent to the pair of the user interface control unit 151 and the mail control unit 152. The mail storage unit of the present invention is equivalent to the memory mentioned above. The memory may be realized as the storage unit 110, or another storage that is different from the storage unit 110.

The user interface control unit 151 has a function to display characters, menu images and so on on the display unit 130 according to the user's operation received from the operation unit 120, and transmit necessary data to the mail control unit 152.

The transmission of the data to the mail control unit 152 is performed when the user inputs a request for mail creation or viewing of a received mail. The data to be transmitted is, for example, a mail text input by the user, a mail text of the received mail (i.e. the original text) which is stored in the received mail area 113 and is to be displayed, e-mail addresses of one or more destinations selected by the user, e-mail addresses of the senders of the received mails, and operation information for identifying whether the user's operation is the request for mail creation or the request for viewing of a received mail.

As described later, the user interface control unit 151 has a function to receive the edited text from the mail control unit 152, and stores the received edited text into the received mail area 113 instead of the original text of the display-target mail mentioned above.

The mail control unit 152 has the following function. In the case the original text received from the user interface control unit 151 (i.e. the mail text input by the user or the mail text of the received mail to be displayed) includes the decoration data, the mail control unit 152 generates the edited text by removing the decoration data, depending on whether the party is a person that requires the mail text replacement with the edited text (the replacement target person). The mail control unit 152 includes a decoration judgment unit 153, a replacement target judgment unit 154, and a mail edition unit 155.

The decoration judgment unit 153 has a function to judge whether the original text includes the decoration data or not. Specifically, in order to perform the judgment, the decoration judgment unit 153 searches the original text for character codes of the emoticons registered in the decoration character table 1000. Also, the decoration judgment unit 153 searches the original text for character codes of the pictographs registered in the decoration character table 1000. Regarding mails in the HTML format, the decoration judgment unit 153 detects the HTML descriptions and data such as images used in the descriptions. The decoration judgment unit 153 may detect decoration characters that have been formed in a prescribed format, even if the characters are not registered in the decoration character table 1000.

The HTML mails mentioned above are multipart-format mails complying with the MIME multipart and so on, standardized based on the RFC (Request For Comment) 2112. That is, the mail text is composed of a plurality of parts logically separated from each other by a prescribed character string called a bounder or the like. Each unit can store therein, for example, plain text data, HTML descriptions corresponding to the plain text data, and data used in the HTML descriptions such as images. The decoration judgment unit 153 detects the boundary in order to detect the HTML descriptions and the data used in the HTML descriptions.

In the case of judging that decoration data is not included, the decoration judgment unit 153 transmits the original text, and the e-mail addresses received from the user interface control unit 151 to the mail transmission unit 156.

The replacement target judgment unit 154 has the following function. In the case the decoration judgment unit 153 judges that the decoration data is included, the replacement target judgment unit 154 judges whether or not each of the parties indicated by the e-mails received from the user interface control unit 151 is the replacement target person, based on the address book 2000.

The mail edition unit 155 has the following function. In the case the replacement target judgment unit 154 judges that any of the parties is the replacement-target person, the mail edition unit 155 generates the edited text by removing the decoration data from the original text. The mail edition unit 155 removes the decoration data by removing the emoticons and the pictographs detected by the decoration judgment unit 153 and the HTML descriptions of the HTML mail and the data used in the HTML descriptions, such as images.

After generating the edited text, if the operation information received from the user interface control unit 151 shows that the user's operation is the request for mail creation, the mail edition unit 155 transmits, to the mail transmission unit 156, the generated edited text and the e-mail address of the party that has been judged by the replacement target judgment unit 154 as the replacement-target person. If any of the parties has been judged by the replacement target judgment unit 154 as the non-target person, the mail edition unit 156 transmits the e-mail address of the party and the original text to the mail transmission unit 156. If the operation information received from the user interface control unit 151 shows that the user's operation is the request for viewing of the received mail, the mail edition unit 155 transmits the generated edited text to the user interface control unit 151.

The mail transmission unit 156 transmits a mail composed of the edited text and a mail composed of the original text to the replacement target person and the non-target person respectively via the wireless communication unit 140, based on the data received from the mail control unit 152.

The mail receiving unit 157 has a function to store the mails received via the wireless communication unit 140 into the received mail area 113.

Data

The following explains the data used by the mobile telephone apparatus 100.

Decoration Character Table

The following explains the decoration character table 1000 stored in the decoration character table area 111 of the storage unit 110.

The decoration character table 1000 is data that includes the emoticons and the pictographs. The mail control unit 152 refers to the decoration character table 1000 when generating the edited text.

Figures 2, 3:
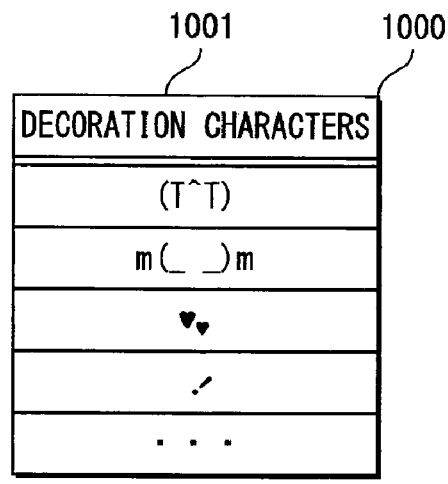
FIG. 2 shows a data structure and example contents of a decoration character table 1000.
FIG. 3 shows a data structure and example contents of an address book 2000.

FIG. 2 shows a data structure and example contents of the decoration character table 1000.

As FIG. 2 shows, the decoration character table 1000 includes a set of decoration characters 1001. The decoration characters 1001 include emoticons and pictographs. Specifically, each emoticon is a character code string including a plurality of characters such as symbols, and each pictograph is a character code for a single two-byte character.

FIG. 2 shows that if the original text includes an emoticon "(TAT)" for example, this emoticon should be removed from the original text when generating the edited text.

To register a new emoticon and so on in the decoration character table 1000 or remove an already registered emoticon and so on, the mobile telephone apparatus 100 downloads emoticon data from a communicable server or the like via the wireless communication 140 and adds the downloaded data or replace the already registered emoticons and so on with the downloaded data. This is performed by the user interface control unit 151 according to an instruction to register or remove the emoticons and so on, input from the operation unit 120 by the user of the mobile telephone apparatus 100.

Address Book

The following explains the address book 2000 stored in the address book area 112 of the storage unit 110.

The address book 2000 has a data structure that is a modification of the structure of an address book that is provided in common portable telephone apparatuses. The address book 2000 is referred to when the user interface control unit 151 prompts the user to select an e-mail address of a destination, or when the replacement target judgment unit 154 judges whether the party is a replacement-target person.

FIG. 3 shows a data structure and example contents of the address book 2000.

As FIG. 3 shows, the address book 2000 includes, for each party, a name 2001, a telephone number 2002, an e-mail address 2003, and replacement information 2004 which are associated with each other.

The name 2001 is the name or the like of a calling/mailing party. The telephone number 2002 is a number assigned to the party's telephone. The e-mail address 2003 is an e-mail address of the party.

The replacement information 2004 is information showing whether to replace the original text of a mail addressed to or received from the party with the edited text. The replacement information may be embodied in any data format as long as it can show whether to replace with the edited text. It is assumed in this embodiment that the replacement information 2004 indicating "1" means that the original text is to be replaced with the edited text, and the replacement information 2004 indicating "0" means that it is not be replaced.

FIG. 3 shows, for example about the party whose name is "Ichiko Inoue", that the telephone number of a mobile telephone apparatus of this party is "09034567890" and the e-mail address is "ichiko@aaa.com", and the replacement information of this party is "0", which means that the original text is not to be replaced with the edited text. In other words, this party is not a replacement-target person.

Also, about the party whose name is "Jiro Saito", FIG. 3 shows that that the telephone number of a mobile telephone apparatus of this party is "09012345678" and the e-mail address is "saito@aaa.com", and the replacement information of this party is "1", which means that the original text should be replaced with the edited text. In other words, this party is a replacement-target person.

Note that the registration of a new entry (including the replacement information) into the address book 2000 and updating and removing of an already registered entry are performed by the user interface control unit 151 according to an instruction input from the operation unit 120 by the user of the mobile telephone apparatus 100.

Operations

The following explains the operations performed by the mobile telephone apparatus 100 having the structure explained above, with reference to FIG. 4 and FIG. 5.

Mail Transmission Processing

Figure 4:
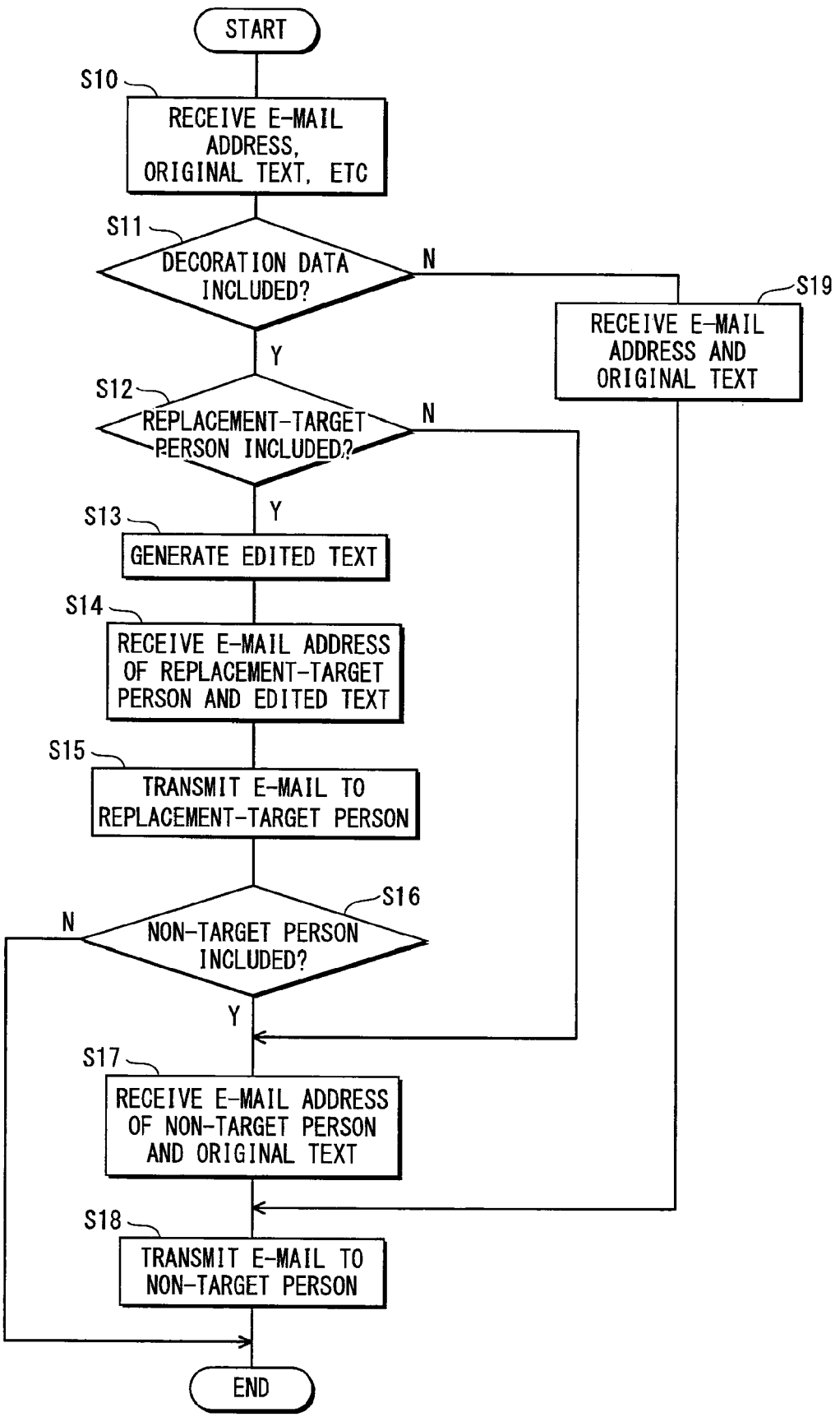
FIG. 4 is a flowchart showing processing procedures for sending mails, performed by the mobile telephone apparatus 100.

FIG. 4 is a flowchart showing processing procedures for sending mails, performed by the mobile telephone apparatus 100.

Upon receipt of a request to generate a mail from the user, the user interface control unit 151 transmits, to the mail control unit 152, the e-mail address of each of one or more destinations selected by the user, the mail body (original text) input by the user, and the request to generate the mail (Step S10).

The decoration judgment unit 153 judges whether the original text received in Step S10 includes decoration data (Step S11). More specifically, the decoration judgment unit 153 performs the judgment by detecting the emoticons and the pictographs registered in the decoration character table 1000, and detecting the HTML descriptions of an HTML mail and data used in the descriptions.

In Step S11, if judged that the original text includes decoration data (Step S11: Y), the replacement target judgment unit 154 judges whether each of the destinations indicated by the e-mail addresses, received by the mail control unit 152 in Step S10, is a replacement-target person or not (Step S12).

If the destinations include one or more replacement-target people (Step S12: Y), the mail edition unit 155 generates an edited mail body (edited text) by removing the decoration data (emoticons, pictographs, HTML descriptions and data used in the descriptions) detected by the decoration judgment unit 153 in Step S11 from the original text received in Step S10 (Step S13).

The mail edition unit 155 transmits, to the mail transmission unit 156, the edited text generated in Step S13 and the e-mail addresses of the destinations judged as the replacement-target people by the replacement target judgment unit 154, based on the request from the user received in Step S10 (Step S14).

The mail transmission unit 156 transmits, to all the replacement-target people, the mail composed of the edited text that has been received in Step S14 (Step S15). If the destinations include people that are not replacement-target people (Step S16: Y), the processing moves to Step S17. If the destinations do not include any non-target people, the mail transmission unit 156 finishes the mail transmission.

Also, in Step S12, if the destinations include no replacement target person (Step S12: N), the processing moves to Step S17 as it is unnecessary to transmit the mail to any replacement target person.

The mail edition unit 155 transmits, to the mail transmission unit 156, the original text received in Step S10 and the e-mail addresses of the destinations judged as non-target people by the replacement target judgment unit 154 (Step S17), and moves to Step S18.

Also, if judged in Step S11 that the original text does not include decoration data (Step S11: N), the mail edition unit 155 transmits, to the mail transmission unit 156, the original text and the E-mail addresses of the destinations received in Step S10 (Step S19), and moves to Step S18.

The mail transmission unit 156 transmits, to the e-mail addresses received in Step S17 or Step S19, a mail composed of the original text received in Step S17 or Step S19 (Step S18), and finishes the mail transmission.

Received Mail Display Processing

Figure 5:
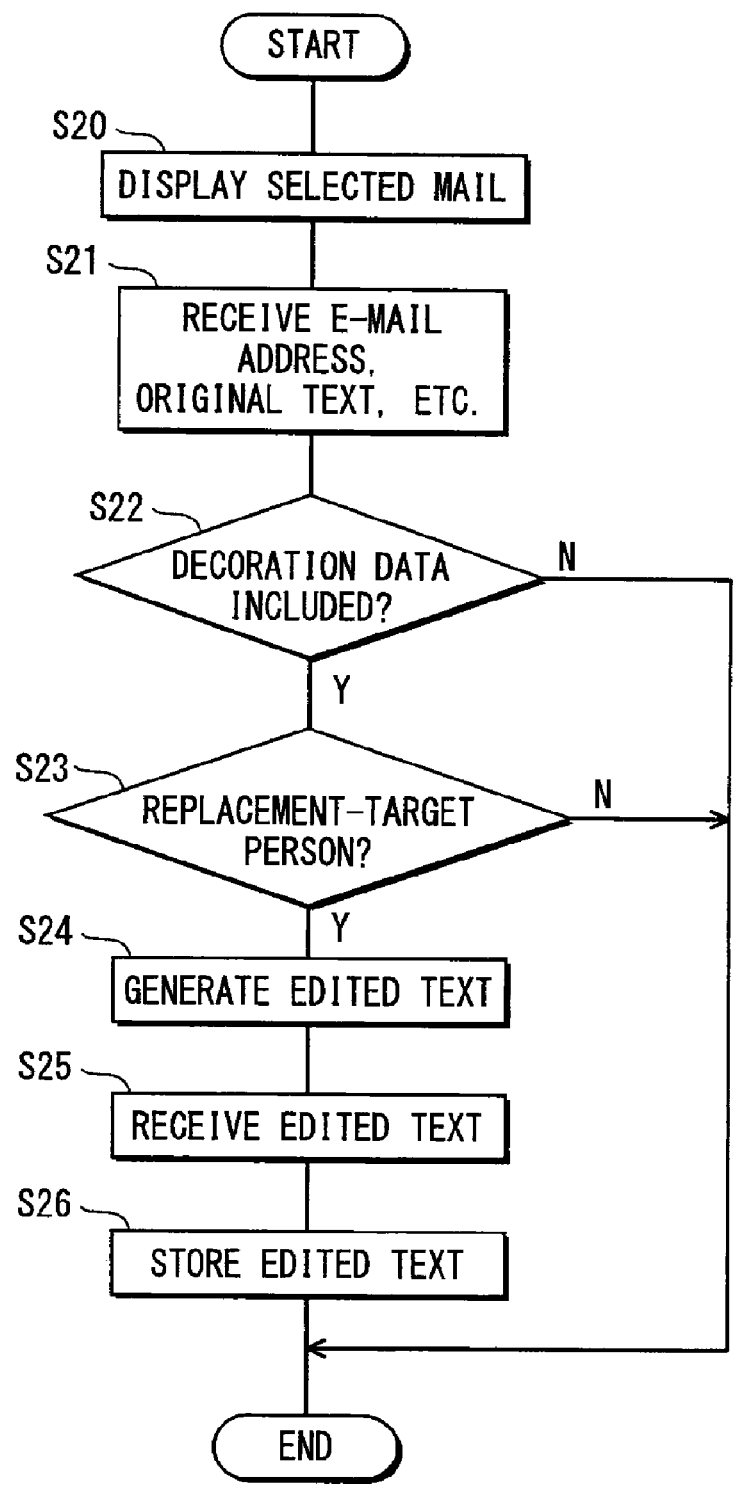
FIG. 5 is a flowchart showing processing procedures for displaying received mails, performed by the mobile telephone apparatus 100.

FIG. 5 is a flowchart showing processing procedures for displaying received mails, performed by the mobile telephone apparatus 100.

Upon receipt of a request from the user to display a received mail, the interface control unit 151 causes the display unit 130 to display the mail body (original text) of the mail selected by the user (Step S20), and transmits, to the mail control unit 152, the original text, the e-mail address of the sender, and the request to display the mail (Step S21).

The decoration judgment unit 153 judges whether the original text received in Step S21 includes decoration data, in the same manner as Step S11 of FIG. 4 (Step S22 of FIG. 5)

In Step S22, if judged that the original text does not include decoration data (Step S22: N), the received mail display processing finishes. If judged in Step S22 that the original text includes decoration data (Step S22: Y), the replacement judgment unit 154 judges whether the sender indicated by the e-mail address received in Step S21 is a replacement-target person (Step S23).

In Step S23, if the sender is not a replacement-target person (Step S23: N), the received mail display processing finishes. If the sender is a replacement-target person (Step S23: Y), the mail edition unit 155 generates an edited mail body (edited text) by removing the decoration data detected by the decoration judgment unit 153 in Step S22 from the original text received in Step S21, in the same manner as Step S13 of FIG. 4 (Step S24).

The mail edition unit 155 transmits the edited text generated in Step S24 to the user interface control unit 151, based on the request received in Step S21 (Step S25).

The user interface control unit 151 stores the edited text, received in Step S25, into the received mail area 113 of the storage unit 110, instead of the original text transmitted in Step S21 (Step S26), and then finishes the received mail display processing.

Explanation of Operations with a Specific Example

The following specifically explains the operations of the mobile telephone apparatus 100 described above, with reference to the flowcharts of FIG. 4 and FIG. 5.

Mail Transmission Processing

Figure 6:
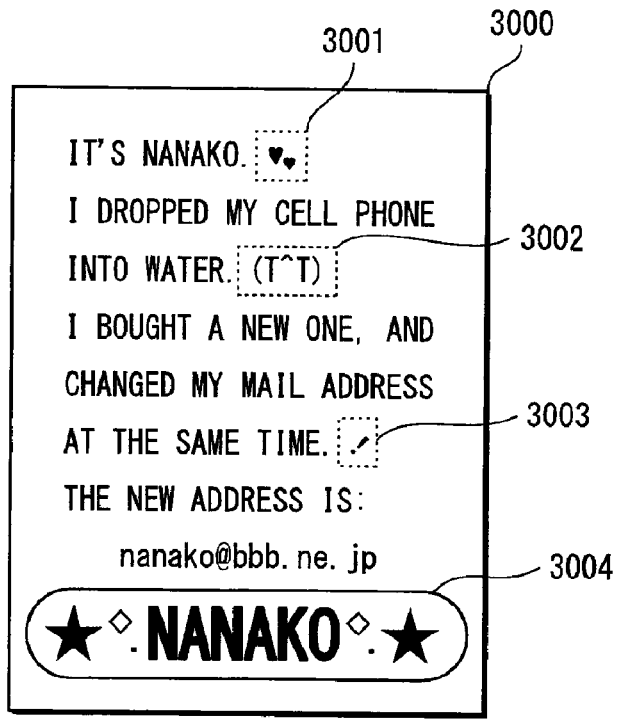
FIG. 6 is an example of a mail body 3000, which is an original text.

FIG. 6 is an example of a mail body 3000.

In this drawing, the mail body 3000 includes, as decoration data, pictographs 3001 and 3003, an emoticon 3002, and an image 3004.

In the following explanation of the mail transmission processing, it is assumed that the mail body in this drawing is the original text input by the user, and that the address "ichiko@aaa.com" (Ichiko Inoue) and the address "saito@aaa.com" (Jiro Saito), shown in FIG. 3, have been selected as the destinations of the transmission.

Upon receipt of a request to generate a mail from the user, the user interface control unit 151 transmits, to the mail control unit 152, the e-mail address of each of one or more destinations selected by the user (i.e. ichiko@aaa.com, saito@aaa.com), the original text input by the user (i.e. the mail text 3000), and the request to generate the mail (Step S10).

The decoration judgment unit 153 judges whether the original text received in Step S10 includes decoration data (Step S11). In this example, the mail text 3000 includes pieces of decoration data as indicated by the reference numbers 3001 to 3004 (Step S11: Y). Accordingly, the replacement target judgment unit 154 judges whether each of the destinations indicated by the e-mail addresses (i.e. ichiko@aaa.com, saito@aaa.com), received in Step S10, is a replacement-target person or not (Step S12).

Figure 7:
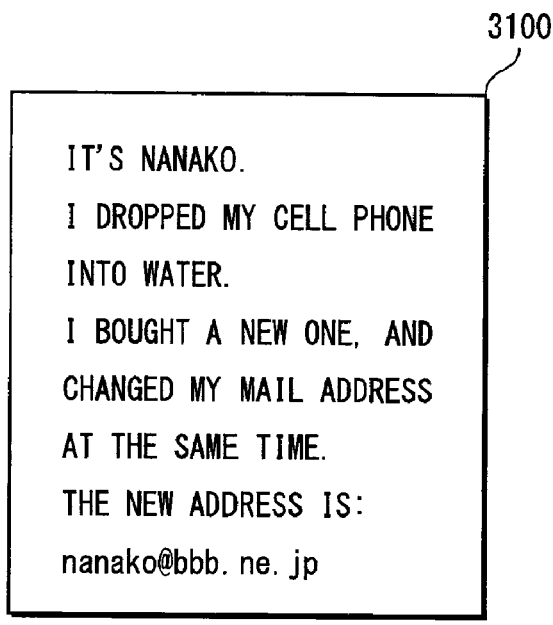
FIG. 7 shows an example of a mail body 3100, which is an edited text.

As FIG. 3 shows, the replacement information of the destination indicated by the address "ichiko@aaa.com" is "0", and the replacement information of the destination indicated by the address "saito@aaa.com" is "1". Accordingly, the replacement target judgment unit 154 judges that a replacement-target person is included in the destinations (FIG. 4, Step S12: YES), and the mail edition unit 155 generates an edited text (the mail text 3100 of FIG. 7) by removing the decoration data (the pieces of decoration data 3001-3004) detected by the decoration judgment unit 153 in Step S11 from the original text (the mail text 3000) received in Step S10 (Step S13 of FIG. 4).

The mail edition unit 155 transmits, to the mail transmission unit 156, the edited text (the mail text 3100) generated in Step S13 and the e-mail address (saito@aaa.com) of the destination judged as the replacement-target person by the replacement target judgment unit 154, based on the request from the user received in Step S10 (Step S14).

The mail transmission unit 156 transmits, to the replacement-target person (saito@aaa.com), the mail composed of the edited text (the mail text 3100) that has been received in Step S14 (Step S15).

After the processing of S15, the mail edition unit 155 transmits, to the mail transmission unit 156, the original text (the mail text 3000) received in Step S10 and the e-mail address (ichiko@aaa.com) of the destination judged as non-target person by the replacement target judgment unit 154 (Step S17).

The mail transmission unit 156 transmits, to the e-mail address (ichiko@aaa.com) received in Step S17, a mail composed of the original text (the mail text 3000) received in Step S17 (Step S18), and finishes the mail transmission.

As described above, with the mobile telephone apparatus 100 pertaining to the first embodiment, the user is only required to prepare an original text that includes decoration data intended by the user to send, to the non-target person, a mail that is composed of the original text that includes the decoration data, while sending, to the replacement-target person, a mail that is composed of the edited text from which the decoration data (e.g. decoration characters, HTML descriptions, and data used in the HTML descriptions, such as images) has been removed. That is, the mobile telephone apparatus can save steps for preparing a mail body by removing the decoration data from the original text only for the non-target people.

Received Mail Display Processing

In the following explanation of the received mail display processing, it is assumed that the mail text 3000 shown in FIG. 6 is the original text to be displayed and the sender is "saito@aaa.com" (Jiro Saito) shown in FIG. 3.

Upon receipt of a request from the user to display a received mail, the interface control unit 151 causes the display unit 130 to display the original text (the mail text 3000) of the mail selected by the user (Step S20 of FIG. 5), and transmits, to the mail control unit 152, the original text (the mail text 3000), the e-mail address of the sender (saito@aaa.com), and the request to display the mail (Step S21).

The decoration judgment unit 153 judges whether the original text (the mail text 3000) received in Step S21 includes decoration data, in the same manner as Step S11 of FIG. 4 (Step S22 of FIG. 5). In this example, the mail text 3000 includes pieces of decoration data as indicated by the reference numbers 3001 to 3004 (Step S21: Y). Accordingly, the replacement target judgment unit 154 judges whether the destination indicated by the e-mail address (saito@aaa.com), received in Step S21, is a replacement-target person or not (Step S23).

As FIG. 3 shows, the replacement information of the destination indicated by the address "saito@aaa.com" is "1". Accordingly, the replacement target judgment unit 154 judges that the destination is a replacement-target person (FIG. 5, Step S23: YES), and the mail edition unit 155 generates an edited text (the mail text 3100 of FIG. 7) by removing the decoration data (the pieces of decoration data 3001-3004) detected by the decoration judgment unit 153 in Step S22 from the original text (the mail text 3000) received in Step S21 (Step S24 of FIG. 5).

The mail edition unit 155 transmits the edited text (the mail text 3100) generated in Step S24 to the user interface control unit 151, based on the request received in Step S21 (Step S25).

The user interface control unit 151 stores the edited text (the mail text 3100), received in Step S25, into the received mail area 113 of the storage unit 110, instead of the original text (the mail text 3000) transmitted in Step S21 (Step S26), and then finishes the received mail display processing.

In the case where decoration data is included in the mail body (the original text) which has been selected by the user, if the party as the sender is the replacement target person, the mobile telephone apparatus 100 pertaining to the first embodiment stores, after displaying the mail, the edited text from which the decoration data has been removed, instead of the original text. Therefore, the mobile telephone apparatus 100 can initially display the original text, and for the second time and later, the mobile telephone apparatus 100 can display the edited text. As a result of the removing of the decoration data from the mail, the mobile telephone apparatus 100 can reduce the size of the received mail to store. Also, when the user reads the received mail again, the user can easily grasp the main point of the mail, because the decoration data such as pictographs has been removed and the mail has a simple appearance.

MODIFICATION EXAMPLE

Outline

The first embodiment is described above on the assumption that in the case where the party is a replacement-target person, the mobile telephone apparatus 100 generates the edited text by removing all the decoration characters included in the original text based on the decoration character table 1000 shown in FIG. 2. However, among decoration characters, some emoticons and so on can be used only for people in particularly close relationship and some can be used for people not in such relatively close relationship. In view of this, the following explains a modification example in which a different edited text is generated from the original text for each party, depending on a replacement level assigned to the party.

In a mobile telephone apparatus pertaining to the modification example, only the functions of the replacement target judgment unit 154 and the mail edition unit 155, and the data structures of the decoration character table 1000 and the address book 2000 are slightly modified from those of the mobile telephone apparatus 100 described above. The following only describes these differences.

Data

The Decoration Character Table

First, the following explains the decoration character table 1100 for use by the mobile telephone apparatus pertaining to the modification example.

FIG. 8 shows a data structure and example contents of the decoration character table 1100.

As FIG. 8 shows, the decoration character table 1100 includes a set of decoration characters 1001 and level information 1101. Since the decoration characters 1001 of the decoration character table 1100 is the same as that of the decoration character table 1000, explanations thereof is omitted here.

The level information 1101 shows use restriction level of the corresponding decoration character. The level information 1101 may be embodied in any data format as long as it can distinguish the use restriction levels. In this modification example, it is assumed that the level information 1101 indicates a value from 1 to 3, and a decoration character that can be used for people in particularly close relationship, such as the user's best friends, are associated with a high value of the level information 1101. That is, a decoration character associated with a value "3" is the decoration character whose use is the most strictly restricted.

To register or change the level information 1101, the mobile telephone apparatus 100 downloads emoticons and so on from a server in the base station, and adds the level information, downloaded together with the emoticons, to the decoration character table or replaces already-registered level information with the downloaded level information. This operation is performed by the user interface control unit 151 according to a level setting operation by the user input via the operation unit 120.

The drawing shows for example that the level of the emoticon "(TAT)" is "2" of 3, which means that the use restriction level is a middle level. The level of the emoticon "m(_ _)m" is "1" of 3, which means that the use restriction level is a low level (i.e. it can be used for people not in a relatively close relationship).

Address Book

Next, an address book 2100 for use by the mobile telephone apparatus pertaining to the modification example is explained.

FIG. 9 shows a data structure and example contents of the address book 2100.

As FIG. 9 shows, the address book 2100 includes, for each party, a name 2001, a telephone number 2002, an e-mail address 2003, and replacement information 2101 which are associated with each other. Since the name 2001, the telephone number 2002 and the e-mail address 2003 are the same as those of the address book 2000, explanations thereof are omitted here.

The replacement information 2101 shows a replacement level for use by the mobile telephone apparatus when generating an edited text from an original text of a mail that is addressed to or has been received from a party. The replacement information 2101 may be embodied in any data format as long as it can distinguish the replacement levels. In this modification example, it is assumed as follows. The replacement information 2101 indicates a value "1" if the original text should be replaced with an edited text that includes only decoration characters whose level information 1101 in the decoration character table 1100 of FIG. 8 is "1". The replacement information 2101 indicates a value "2" if the original text should be replaced with an edited text that includes decoration characters whose level information 1101 in the decoration character table 1100 is "2" or lower. The replacement information 2101 indicates a value "3" if the original text should be replaced with an edited text that includes decoration characters whose level information 1101 in the decoration character table 1100 is "3" or lower. In other words, since the level information 1101 is represented with values 1-3, parties whose replacement information 2101 is "1" or "2" are replacement-target people, and parties whose replacement information 2101 is "3" are non-target people.

For example, FIG. 9 shows that the replacement information of a party whose name is "Ichiko Inoue" is "3". This means that this party is not a replacement-target person. The replacement information of a party whose name is "Jiro Sato" is "1". This means that this party is a replacement-target person, and an original text relating to this party should be replaced with an edited text that includes only decoration characters whose level information 1101 in the decoration character table 1100 is "1".

Operations

The following explains operations performed by the mobile telephone apparatus pertaining to the modification example.

Mail Transmission Processing

Figure 10:
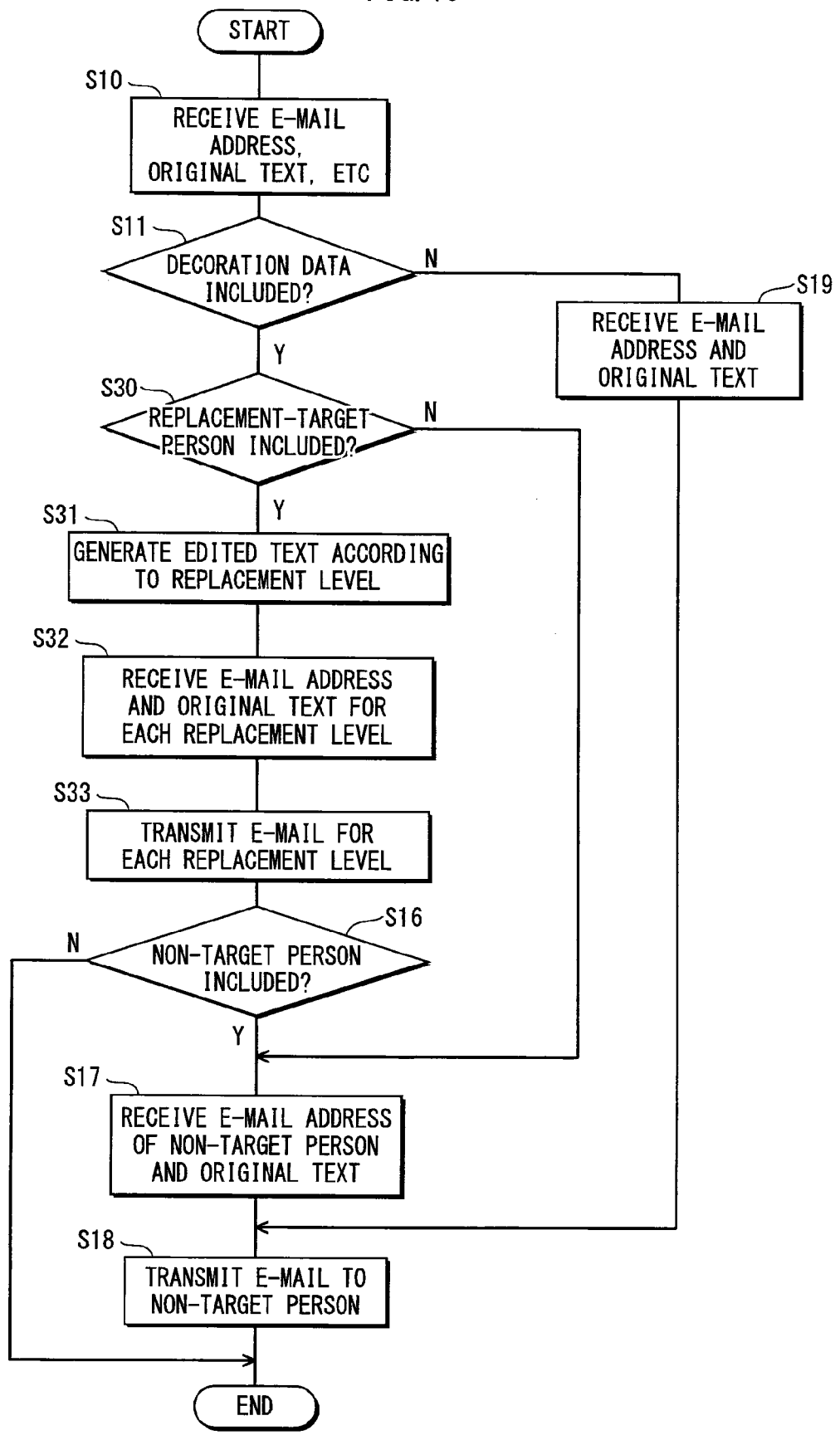
FIG. 10 is a flowchart showing processing procedures for sending mails, performed by a mobile telephone apparatus pertaining to a modification example.

FIG. 10 is a flowchart showing processing procedures for sending mails, performed by the mobile telephone apparatus pertaining to the modification example. Steps S30-S33 in FIG. 10 are different from the mail transmission processing performed by the mobile telephone apparatus 100 pertaining to the first embodiment. Therefore, the following mainly explains these Steps.

In Step S11, if judged that the original text includes decoration data (Step S11: Y), the replacement target judgment unit pertaining to the modification judges whether each of the destinations indicated by the e-mail addresses, received in Step S10, is a replacement-target person or not (Step S30). That is, destinations whose replacement information 2101 in the address book 2100 of FIG. 9 is "1" or "2" are determined as a replacement-target people, and destinations whose replacement information 2101 is "3" are determined as non-target people.

If the destinations include one or more replacement-target people (FIG. 10, Step S30: Y), the mail edition unit pertaining to the modification example generates, for each replacement-target person, an edited mail body (edited text) according to the corresponding replacement level indicated by the replacement information 2101 of the address book 2100, by removing the decoration data detected by the decoration judgment unit 153 in Step 11 except for the corresponding decoration characters (Step S31).

The mail edition unit pertaining to the modification example transmits, to the mail transmission unit 156, the edited texts generated in Step S31 and the e-mail addresses of the destinations judged as the replacement-target people by the replacement target judgment unit pertaining to the modification example, based on the request from the user received in Step S10 (Step S32). This transmission is performed for each replacement level indicated by the replacement information 2101.

The mail transmission unit 156 transmits mails, based on the e-mail addresses and the edited texts received in Step S32 according to the replacement level (Step S33). This mail transmission is performed for each replacement level. After that, the processing moves to Step S16.

Received Mail Display Processing

Figure 11:
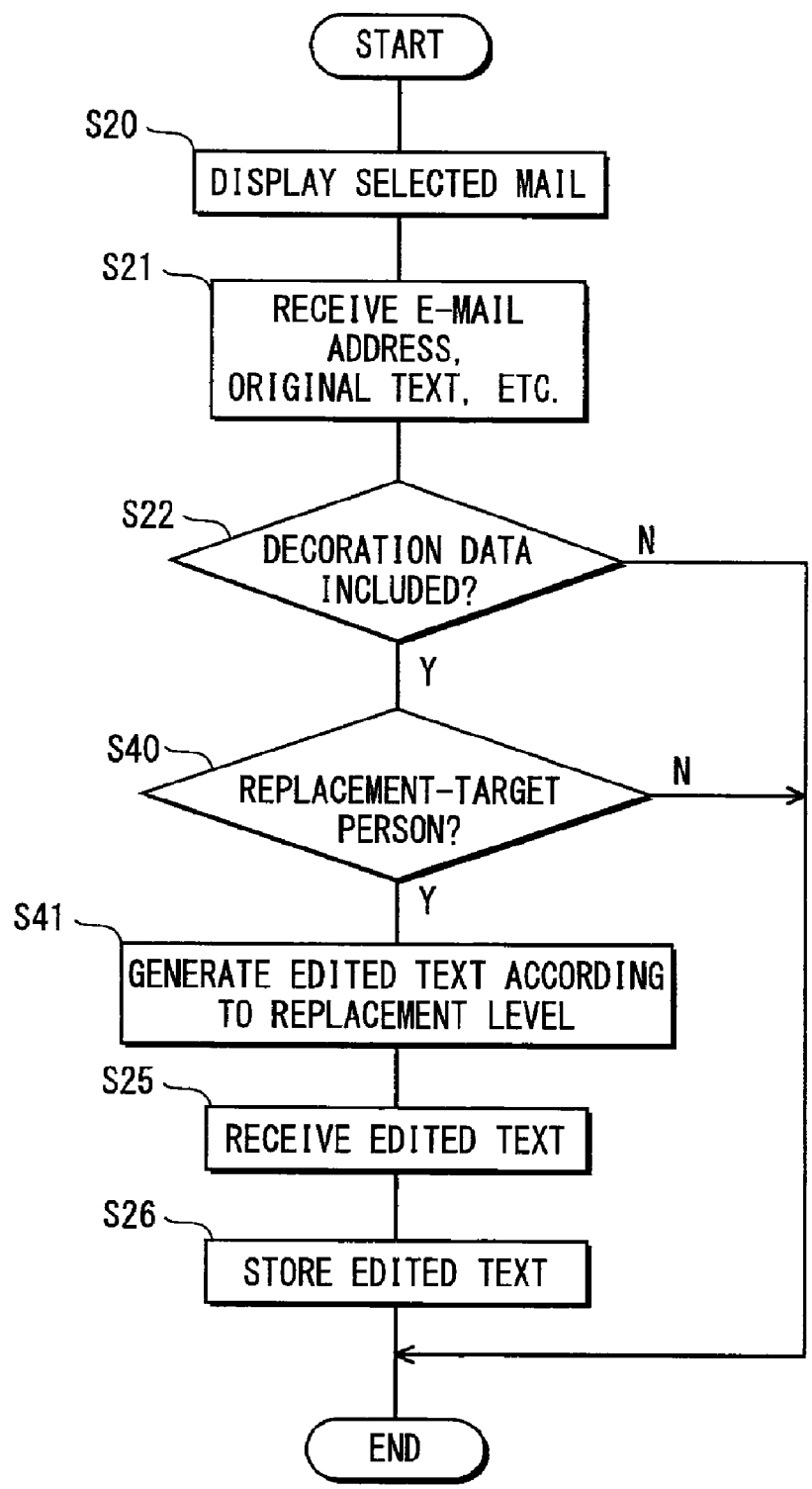
FIG. 11 is a flowchart showing processing procedures for displaying received mails, performed by a mobile telephone apparatus pertaining to the modification example.

FIG. 11 is a flowchart showing processing procedures for displaying received mails, performed by the mobile telephone apparatus pertaining to the modification example. Steps S40 and S41 in FIG. 11 are different from the received mail display processing performed by the mobile telephone apparatus 100 pertaining to the first embodiment. Therefore, the following mainly explains these Steps.

In Step S22, if judged that the original text includes decoration data (Step S22: Y), the replacement judgment unit pertaining to the modification example judges whether the sender indicated by the e-mail address received in Step S21 is a replacement-target person (Step S40). This judgment is performed in the same manner as in Step S30 of FIG. 10.

In Step S40 of FIG. 11, if the sender is not a replacement-target person (Step S40: N), the received mail display processing finishes. If the sender is a replacement-target person (Step S40: Y), the mail edition unit pertaining to the modification example generates an edited mail body (edited text) according to the corresponding replacement level indicated by the replacement information 2101 of the address book 2100, by removing the decoration data detected by the decoration judgment unit 153 in Step S22 except for the corresponding decoration characters (Step S41). After that, the processing moves to Step S25.

Explanation of Operations with a Specific Example

The following specifically explains the operations of the mobile telephone apparatus pertaining to the modification example described above, with reference to the flowcharts of FIG. 10 and FIG. 11. Here, the differences from the mobile telephone apparatus 100 pertaining to the first embodiment are mainly explained.

Mail Transmission Processing

In the following explanation of the mail transmission processing, it is assumed that the mail text 3000 shown in FIG. 6 is the original text input by the user, and that the address "saito@aaa.com" (Jiro Saito) and the address "nishi@bbb.co.jp" (Saburo Nishimura), shown in FIG. 9, have been selected as the destinations of the transmission.

In Step S11 of FIG. 10, the mail text 3000 includes pieces of decoration data as indicated by the reference numbers 3001 to 3004 (Step S11: Y). Accordingly, the replacement target judgment unit 154 judges whether each of the destinations indicated by the e-mail addresses (i.e. saito@aaa.com, nishi@bbb.co.jp), received in Step S10, is a replacement-target person or not (Step S30).

In this example, the pieces of replacement information 2101 corresponding to the destinations in the address book 2100 are "1" and "2" respectively. Accordingly, the replacement target judgment unit 154 judges that the destinations are replacement-target people (Step S30: Y). The mail edition unit pertaining to the modification example generates an edited mail body (edited text), by removing the decoration data corresponding to the value "1" of the replacement information 2101 from the original text (the mail text 3000) received in Step 10. In other words, the mail edition unit removes the decoration characters detected by the decoration judgment unit 153 in Step 11, except for the decoration characters corresponding to the value "1" of the level information 1101 in the decoration character table 1100 (i.e. the mail edition unit removes the characters 3001, 3002 and 3004). The mail edition unit pertaining to the modification example also generates another edited mail body (edited text), by removing the decoration data corresponding to the value "2" of the replacement information 2101. In other words, the mail edition unit removes the decoration characters detected by the decoration judgment unit 153 in Step 11, except for the decoration characters corresponding to the values "1" and "2" of the level information 1101 in the decoration character table 1100 (i.e. the mail edition unit removes the characters 3001 and 3004) (Step S31).

The mail edition unit pertaining to the modification example transmits, to the mail transmission unit 156, the edited text generated by removing the decoration data (3001, 3002 and 3004) in Step S31 and the e-mail address (saito@aaa.com) of the destination whose replacement information 2101 is "1", based on the request from the user received in Step S10. Also, the mail edition unit transmits, to the mail transmission unit 156, the edited text generated by removing the decoration data (3001 and 3004) and the e-mail address (nishi@bbb.co.jp) of the destination whose replacement information 2101 is "2", based on the request from the user received in Step S10 (Step S32).

The mail transmission unit 156 transmits a mail composed of the edited text generated by removing the decoration data (3001, 3002 and 3004) and a mail composed of the edited text generated by removing the decoration data (3001 and 3004)

to the address "saito@aaa.com" and the address "nishi@bbb.co.jp" respectively (Step S33). Then, the processing moves to Step S16.

As described above, the mobile telephone apparatus pertaining to the modification example can transmit a mail composed of an edited text with a different removal level depending on the replacement information. Accordingly, the user of this mobile telephone apparatus can save steps for separately creating edited texts with different removal levels.

Received Mail Display Processing

In the following explanation of the received mail display processing, it is assumed that the mail text 3000 shown in FIG. 6 is the original text to be displayed and the sender is "nishi@bbb.co.jp" (Saburo Nishimura) shown in FIG. 3.

In Step S22, it is judged that the mail text 3000 includes pieces of decoration data as indicated by the reference numbers 3001 to 3004) (Step S22: Y). Accordingly, the replacement target judgment unit pertaining to the modification example judges whether the sender indicated by the e-mail address (i.e. nishi@bbb.co.jp), received in Step S21, is a replacement-target person or not (Step S40).

In Step S40, it is judged that the replacement information 2102 in the address book 2100 of the sender indicated by the address "nishi@bbb.co.jp" is "2". Accordingly, the replacement target judgment unit judges that the sender is a replacement-target person (Step S40: Y). The mail edition unit pertaining to the modification example generates an edited text by removing the decoration data corresponding to the value "2" of the replacement information 2101 from the original text (the mail text 3000) received in Step S20. In other words, the mail edition unit removes the decoration data detected by the decoration judgment unit 153 in Step S22, except for the decoration characters corresponding to the value "2" of the level information 1101 in the decoration character table 1100 (i.e. the mail edition unit removes the characters 3001 and 3004) (Step S41). Then, the processing moves to Step S25.

Supplementary Explanations (1) In the explanations of the first embodiment and the modification example, it is assumed that whether to replace the mail text input by the user and the mail text (the original text) of a received mail that has been selected by the user for display with an edited text is judged based only on the replacement information included in the address book. However, the replacement information may be divided into two. That is, replacement information for judging whether to replace the mail text input by the user with the edited text, and replacement information for judging whether to replace the mail text of a received mail that has been selected by the user for display may be separately registered in the address book.

(2) In the explanations of the first embodiment and the modification example, it is assumed that a mail text input by the user is regarded as the original text. However, a mail text of a mail received or transmitted in the past may be regarded as the original text. For example, in the case of forwarding a mail received in the past, if the destination of the forwarding is a replacement-target person, the user of the mobile telephone apparatus can transmit the edited mail from which decoration data has been removed, without taking steps for removing decoration data from the original text.

(3) In the explanations of the first embodiment and the modification example, it is assumed that whether to store the edited text instead of the mail text of the received mail to be displayed is judged when the user views the received mail. However, the judgment may not be performed on received mails on which the judgment has already been performed. To realize this, a flag showing that a mail has been displayed may be stored for each received mail that has been displayed after the display, and the judgment may be performed only if the flag is not stored.

(4) In the explanations of the first embodiment and the modification example, it is assumed that even if the mail text (the original text) of a mail received from a replacement-target person includes decoration data, the original text is displayed when the mail is displayed for the first time. However, the edited mail may be displayed even when the mail is displayed for the first time. To realize this, the judgment may be performed at receipt of a mail, or just before displaying the mail, and the edited text may be stored according to the result of the judgment.

(5) In the explanations of the first embodiment and the modification example, it is assumed that whether to store the edited text is determined at every viewing of a mail by the user. However, in the case where the size of the received mails stored in the received mail area 113 of the storage unit 110 reaches a prescribed size, whether to store the edited text instead of the stored mail text may be judged for each received mail. As a result, it is possible to reduce the data size of the received mails and suppress the use of the storage area.

(6) In the explanations of the first embodiment and the modification example, it is assumed that the transmission of the edited text and the storage of the edited text are performed automatically. However, the transmission and the storage may be performed after confirmation of the judgment result by the user. For the confirmation, in the case where the original text includes decoration data for example, each party as a sender or a destination may be displayed in a different font or color according to whether the party is a replacement-target person. If this is the case, the user makes a selection from the displayed parties, and a different mail text will be displayed according to the selected party (i.e. if the selected party is not a replacement-target person, the original text will be displayed, and if the selected party is a replacement-target person, the edited text will be displayed).

As a result, the mobile communication terminal apparatus pertaining to the present invention can display information of each party in a different display mode according to whether the party is the replacement-target person. Therefore, the user can easily distinguish whether the party is the replacement-target person or not.

(7) In the explanations of the first embodiment and the modification example, the transmission histories of mails are not specifically mentioned. However, the mail transmission history may be stored in the same manner as common mobile telephone apparatuses. When requested by the user, the mobile telephone apparatus of the present invention may display the mail history may be displayed in the following manner. In the first embodiment and the modification example, in the case where the original text includes decoration data, if the destinations selected by the user include both replacement-target people and non-target people, a mail that is composed of the edited text is transmitted to all the replacement-target people, and a mail that is composed of the original text is transmitted to all the non-target people. Therefore, two transmission histories are recorded. When the user view these histories, in the same manner as the confirmation of the judgment result by the user explained in (6) above, these histories may be displayed as a single history. In other words, the histories may be displayed in different manners according to whether the party is the replacement-target person, and during the display, a mail text according to the selected party may be displayed.

(8) In the explanations of the first embodiment and the modification example, it is assumed that the mobile communication terminal apparatus sends only e-mails. However, it may send mails that can be realized with use of a short mail service provided by telecommunication companies (i.e. "short mails"). Also, the mobile communication terminal apparatus may change the mail type according to the type of the mail body. For example, the mobile communication terminal apparatus may use an e-mail in the case of sending a mail composed of the original text, and use a short mail in the case of sending a mail composed of the edited text.

(9) In the explanations of the first embodiment and the modification example, it is assumed that the mobile communication terminal apparatus removes the decoration characters included in the original text. However, it may replace the characters with different characters according to a prescribed rule, instead of deleting them. Such replacement may be determined by the user according to the familiarity with the party. If this is the case, the user can easily edit mails to send, according to the party.

(10) It is assumed in the explanations above that the replacement information 2101 of the address book 2100 pertaining to the modification example shows the level of the decoration characters to be included in the edited text. However, this is the same as showing the level of the decoration characters to be removed from the original text. For example, if the replacement information 2101 is "1", this shows that the original text is to be replaced with an edited text that includes decoration characters corresponding to the value "1" of the level information 1101. This is the same as showing that decoration characters corresponding to the values "2" and "3" of the level information 1101 are to be removed.

(11) Part or all of the components of the mobile communication terminal apparatus explained in the first embodiment and the modification example may be realized as an integrated circuit with a single chip or a plurality of chips, or as computer programs. The components of the mobile communication terminal apparatus may be realized in any form.

(12) It is assumed in the first embodiment that the mail edition unit 155 of the mobile telephone apparatus 100 generates an edited text by removing decoration data from an original text. However, the mobile telephone apparatus 100 may use an edited text acquired from outside, instead of generating it.

This modification can be realized as follows: a mobile telephone apparatus pertaining to this modification transmits an original text to an external server or the like that is capable of generating an edited text from the original text, and the external server or the like transmits the generated edited text to the mobile telephone apparatus. Note that the same modification may be applied to any of the modification examples of the mobile communication terminal apparatus above.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed:

1. A mobile communication terminal apparatus that has a mail transmitting function, the mobile communication terminal apparatus comprising:
    a mail storage unit that stores therein a first mail text that includes particular data, and at least one destination;
    a replacement information storage unit that stores therein, for each of parties including the destination, replacement information that shows whether a party corresponding thereto requires mail text replacement; and
    a mail transmission control unit operable to transmit the first mail text to the destination if the replacement information corresponding to the destination shows that mail text replacement is not required, and if the replacement information corresponding to the destination shows that mail text replacement is required, transmit a second mail text, composed from the first mail text through edition of at least the particular data, to the destination, wherein
    the mobile communication terminal apparatus further comprises a character string storage unit that stores therein a plurality of first-type character strings each consisted of at least one character, and
    if the particular data includes at least one of the first-type character strings, the mail transmission control unit edits the particular data by removing the at least one of the first-type character strings from the particular data, wherein
    the replacement information further shows a replacement level,
    the character string storage unit further stores therein one or more second-type character strings each consisted of at least one character, and
    if the particular data further includes at least one of the second-type character strings, and the replacement information corresponding to the destination shows that mail text replacement is requires, the mail transmission control unit edits the particular data by removing the at least one of the first-type character strings from the particular data, or removing the at least one of the first-type character strings and the at least one of the second-type strings from the particular data, depending on the replacement level of the replacement information corresponding to the destination.

2. The mobile communication terminal apparatus of claim 1, wherein
    the first mail text is in HTML format, and
    the mail transmission control unit edits the particular data by removing an HTML description part included therein and data used in the HTML description part.

3. The mobile communication terminal apparatus of claim 1, wherein
    the mail storage unit stores therein a plurality of destinations, and
    the mobile communication apparatus further comprises:
        a display unit operable to display the destinations stored in the mail storage unit; and
        a display control unit operable to cause the display unit to display each of the destinations in a different display mode, according to whether the destination requires mail text replacement.

4. The mobile communication terminal apparatus of claim 1, wherein the mobile communication terminal apparatus further includes a mail receiving function, and the mobile communication terminal apparatus further comprising:
    a received mail storage unit; and
    a storage control unit operable to control the received mail storage unit to store therein a mail text of a received mail if the replacement information corresponding to a sender of the received mail, included in the parties, shows that mail text replacement is not required, and if the replacement information corresponding to the sender shows that mail text replacement is required, control the received mail storage unit to compose another mail text from the mail text of the received mail by removing particular data included in the mail text, and store therein the composed mail text.

5. A mobile communication terminal apparatus that has a mail receiving function, the mobile communication terminal apparatus comprising:
- a received mail storage unit that stores therein a first mail text of a received mail that includes particular data, and an address of a sender;
- a replacement information storage unit that stores therein replacement information that shows whether the sender requires mail text replacement; and
- a storage control unit operable to keep the received mail storage unit storing therein the first mail text if the replacement information corresponding to the sender shows that mail text replacement is not required, and if the replacement information corresponding to the sender shows that mail text replacement is required, the storage control unit controls the received mail storage unit to compose a second mail text from the first mail text by editing the particular data, and store therein the second mail text instead of the first mail text, wherein
- the mobile communication terminal apparatus further comprises a character string storage unit that stores therein a plurality of first-type character strings each consisted of at least one character, and
- if the particular data includes at least one of the first-type character strings, the storage control unit edits the particular data by removing the at least one of the first-type character strings from the particular data, wherein
- the replacement information further shows a replacement level,
- the character string storage unit further stores therein one or more second-type character strings each consisted of at least one character, and
- if the particular data further includes at least one of the second-type character strings, and the replacement information corresponding to the sender shows that mail text replacement is required, the storage control unit edits the particular data by removing at least one of the first-type character strings from the particular data, or removing the at least one of the first-type character strings and the at least one of the second-type character strings from the particular data, depending on the replacement level of the replacement information corresponding to the sender.

6. The mobile communication terminal apparatus of claim 5, further comprising
- a display unit operable to display the first mail text or the second mail text, wherein
- the storage control unit controls the received mail storage unit after the display unit displays the first mail text.

7. The mobile communication terminal apparatus of claim 5, wherein
- the received mail storage unit stores therein a plurality of received mails, and
- the storage control unit controls the received mail storage unit when a total size of the received mails stored in the received mail storage unit reaches a predetermined size.

* * * * *